(No Model.) 2 Sheets—Sheet 1.

T. J. MEGOWN.
AUTOMATIC BRAKE FOR RAILROAD CARS.

No. 365,840. Patented July 5, 1887.

Witnesses
F. H. Schott
W. H. Ruff

Inventor
Thomas J. Megown
By his Attorney Newton Cranford (No Model.) 2 Sheets—Sheet 2.
T. J. MEGOWN.
AUTOMATIC BRAKE FOR RAILROAD CARS.
No. 365,840. Patented July 5, 1887.
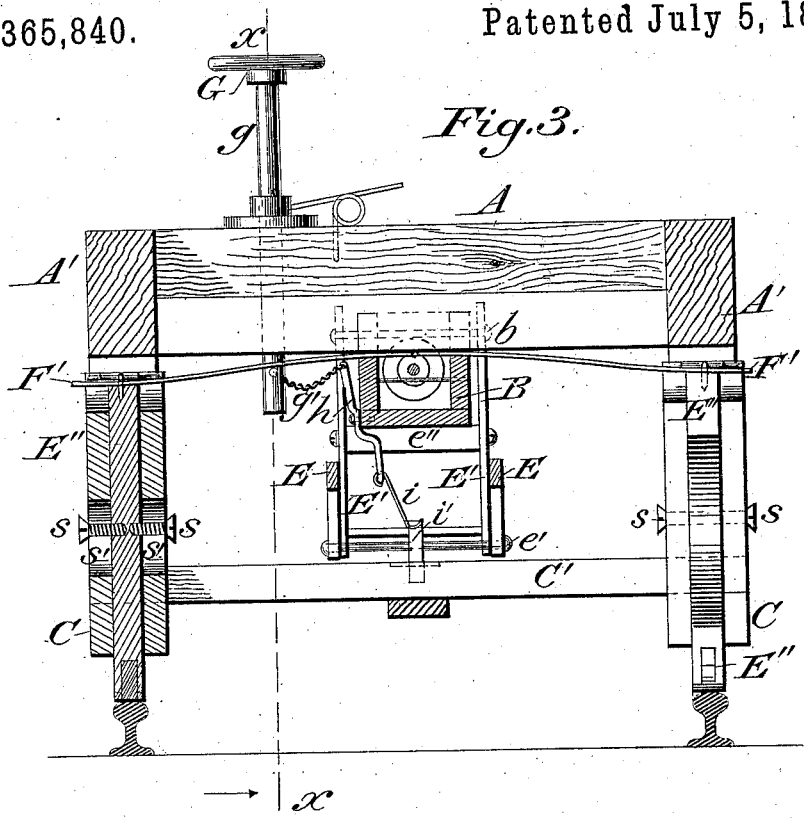
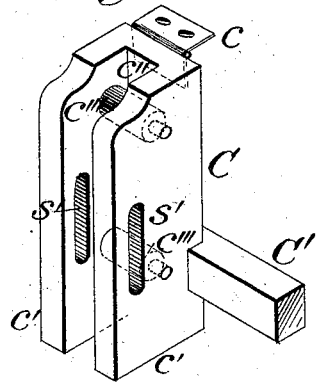
Witnesses
F. H. Schott
M. A. Ruff
Inventor
Thomas J. Megown,
By his Attorney Newton Cranford

UNITED STATES PATENT OFFICE.

THOMAS JEFFERSON MEGOWN, OF BEAVER FALLS, PENNSYLVANIA.

AUTOMATIC BRAKE FOR RAILROAD-CARS.

SPECIFICATION forming part of Letters Patent No. 365,840, dated July 5, 1887.

Application filed May 6, 1887. Serial No. 237,318. (No model.)

*To all whom it may concern:*

Be it known that I, THOMAS JEFFERSON MEGOWN, a citizen of the United States, residing at Beaver Falls, in the county of Beaver and State of Pennsylvania, have invented certain new and useful Improvements in Automatic Brakes for Railroad-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to automatic brakes for railroad-cars, and especially to that kind of brake that is constructed to apply friction to a car-wheel and at the same time apply friction upon the top of the rails, in order to brake up or slacken the motion or stop the speed of a car, or a train of cars, by the backward reciprocation of the draw-bar or the means of propelling a car; and it consists in the construction of the operating parts and their special combinations to produce the object sought for; also, of a means for releasing the brakes from the wheels and rails when a car is separated from others and the brakes are locked upon the wheels, or to prevent the locking while backing, as will be fully hereinafter described.

Figure 1:
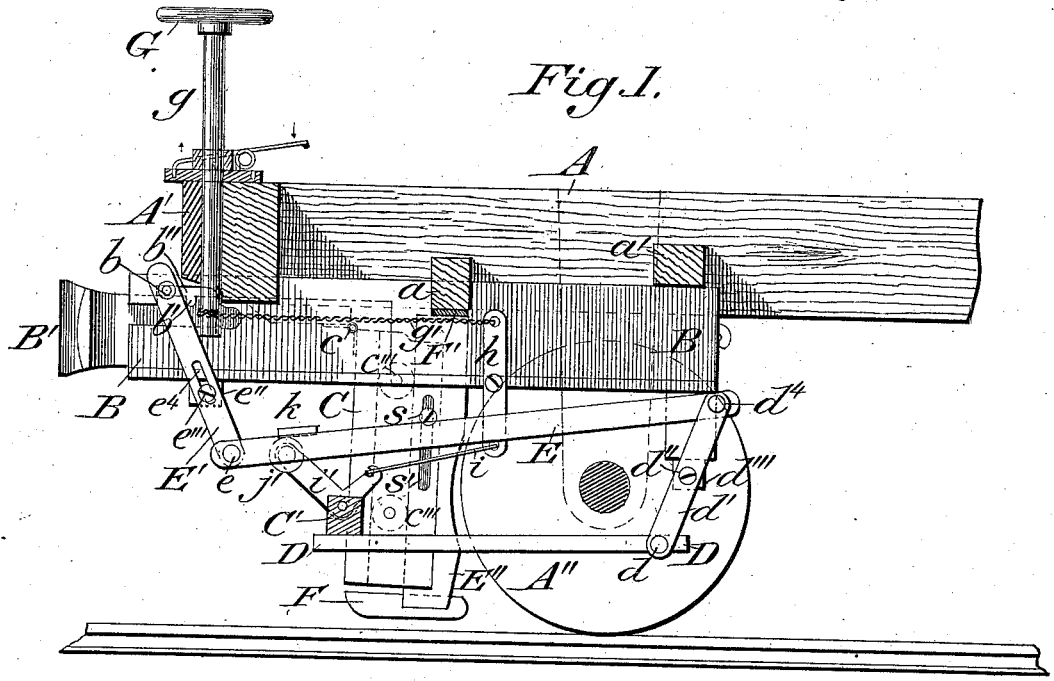
Figure 2:
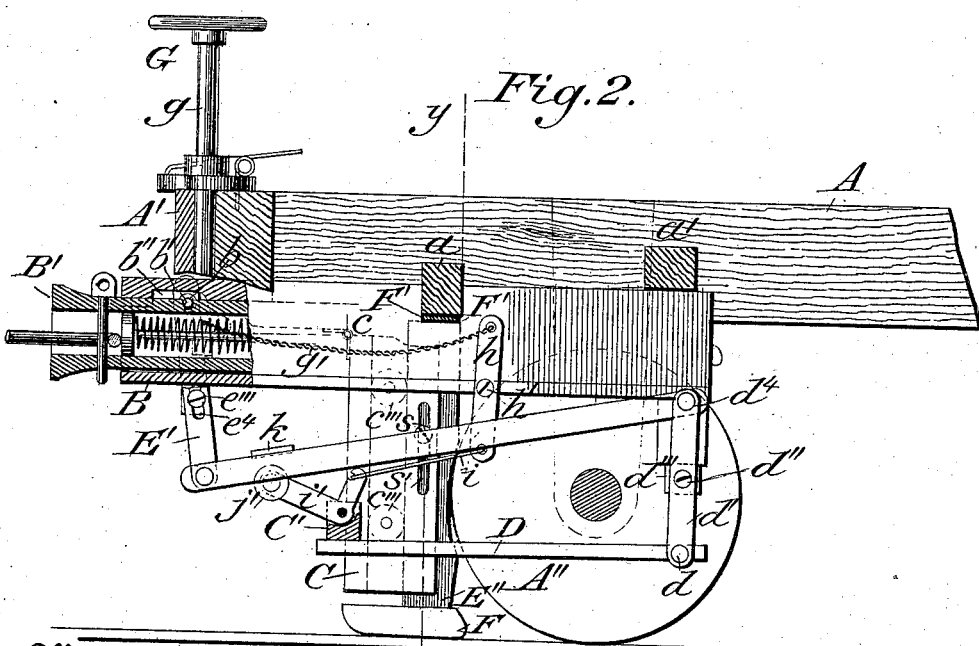

In the drawings, Figure 1 is an upright side view of one end of the sills of a car, its wheels, and the operating parts of the brakes when the brakes are off. Fig. 2 is a view of the same, partly in section, and showing the brakes on the wheels and the rails. Fig. 3 is a transverse section of the same on line $y\ y$ of Fig. 2, and Fig. 4 is a perspective of the brake-stocks, in which the brake-shoes are secured and reciprocate.

A represents the ordinary longitudinal sills of a car; A', the main end sills, and $a\ a'$ the necessary cross intermediate sills.

A'' represents the car-wheels, secured to the car-frame by any of the well-known means.

B represents the draw-bar case, secured to the sills of the car in any suitable and secure manner; and B' represents the draw-bar in the case B, having any of the usual forms of construction to allow of proper reciprocation in the case and means for coupling two cars together.

C C represent brake-stocks attached to the sills of a car by the hinges $c$, which hinges allow the stocks to vibrate to or from the wheels. These brake-stocks are constructed to have three strong sides, $c'\ c'$, forming the opposite sides, and $c''$ the back, or the side farthest from the wheel. Between the two sides $c'$ are friction-rollers $c'''$, having their axles journaled in the sides $c'$ of the stock, as seen in Fig. 4.

C' is a transverse brake-beam extending from one brake stock on one side of the car to the stock on the opposite side, and this beam is permanently secured to the two opposite stocks.

D is a longitudinal bar attached to the brake-beam C' at one end, and extends back beyond the axle of the adjacent wheels of the car, where it is pivoted to a cross-rod, $d$, between the parallel arms $d'\ d'$, which are pivoted at $d''$ to any secure downwardly-projecting support, $d'''$, from the sills or frame-work of the car. The top ends of arms $d'$ are pivoted at $d^4$ to long parallel arms E, that extend to upwardly-parallel arms E', that are pivoted at $e$ by rod $e'$ thereto at their lower ends. Arms E' are pivoted to support $e''$, that is secured to the under side of the case B, the pivots $e'''$ working in slots $e^4$ in the arms, that allows the arms to rise or fall on their pivots, while the arms extend above the draw-bar B', and have near their top ends a cross-bar, $b$, that secures the arms in position, and will also act to lock the draw-bar and hold it from reciprocating when the cross-bar $b$ drops into the notch $b'$ in the top side of the draw-bar.

E'' E'' are sliding brake-shoes, that slide in the open slot of the stocks C, their backs resting against the friction-rollers $c'''\ c'''$, and are kept in place by the screws $s$, that are screwed into the sides of the shoes through slots $s'$ in the stocks C. The shoes E'' are slightly concave on the faces that come against the wheels, which bearing-surfaces are of the kind of metal in use for such purpose, and are removable from the body of the shoes. The brake-shoes may be held in any position desired in the stocks by the holding-screws $s$, and so that the soles will not come onto the rails when the brakes are on the wheels, when not desired.

F F are soles at the bottom ends of the sliding brake-shoes, and are forced by the revolution of the wheels when the shoes are bearing hard against them, which forces them down upon the rails, and are firmly attached to the shoes in any proper and sure means.

F' is a transverse flat spring-bar secured at its center to cross-sill $a$ of the car-body, its ends extending to the top of the brake-shoes E", where it is secured, its office being to lift the brake-shoes and soles up when the brakes are off.

Fig. 1 shows the cross-bar $b$ raised upon the top of the draw-bar and in a recess, $b''$, in the lower side of the top of case B, and the draw-bar is free to reciprocate, and the brakes are off, while in Fig. 2 the brakes are on the wheels and the bar $b$ is in notch $b'$, and the brakes are locked on unless a forward movement is made upon the draw-bar, and if a car is separated from the propelling power so locked a means must be provided for raising the bar $b$ out of the notch in the draw-bar, else the car cannot be easily moved, and for such purpose a hand device is constructed consisting of a hand-wheel, G, on upright shaft, $g$, and is placed upon the platform of a car, and passing through and below the platform far enough to have a winding-chain, $g'$, attached thereto and extending back to top of pivoted lever $h$, that is pivoted to case B at $h'$, while the lower end of lever $h$ has a link or rod, $i$, engaging bell-crank $i'$, that is pivoted at its angle to the brake-beam C', and its inclined arm $j$, having at its outer end friction-roller $j'$, to act upon a cross-bar, $k$, that is secured on the top of arms E, which construction, when shaft $g$ is turned to shorten the chain $g'$, the long inclined arm of the bell-crank is moved to have the friction-roller lift the cross-bar $k$ upward, and thereby raise the cross-bar $b$ out of the notch $b'$ in the draw-bar, which allows freedom to said draw-bar, and the car or cars can be moved in any direction on the track.

Having thus described my invention, what I claim, and desire to secure by Letters Patent, is—

1. In combination with the draw-bar of a car, the pivoted arms E', E, and $d'$, arms D, brake-beam C', and the hinged stocks C, having sliding brake shoes E" therein, substantially as described.

2. The brake-stocks C', having therein friction-rollers $c'''$ $c'''$, and the sliding brakes E", substantially as described.

3. The combination of the winding shaft $g$, chain $g'$, lever $h$, link $i$, bell-crank $i'$, and arms E and E', having cross-bar $b$, with the draw-bar B', substantially as described.

In testimony whereof I affix my signature in presence of two witnesses.

THOMAS JEFFERSON MEGOWN.

Witnesses:
J. F. MILLER,
G. L. EBERHART.